(12) United States Patent
Blacklidge

(10) Patent No.: US 10,273,637 B2
(45) Date of Patent: Apr. 30, 2019

(54) HOT APPLIED TACK COAT

(75) Inventor: Roy Brittany Blacklidge, Gulfport, MS (US)

(73) Assignee: Blacklidge Emulsions, Inc., Gulfport, MS (US)

( * ) Notice: Subject to any disclaimer, the term of this patent is extended or adjusted under 35 U.S.C. 154(b) by 0 days.

(21) Appl. No.: 13/034,579

(22) Filed: Feb. 24, 2011

(65) Prior Publication Data

US 2011/0206455 A1 Aug. 25, 2011

Related U.S. Application Data

(60) Provisional application No. 61/307,749, filed on Feb. 24, 2010.

(51) Int. Cl.
| | |
|---|---|
| *E01C 7/18* | (2006.01) |
| *C09J 195/00* | (2006.01) |
| *C10C 3/00* | (2006.01) |
| *C08L 91/06* | (2006.01) |

(52) U.S. Cl.
CPC ............ *E01C 7/185* (2013.01); *C09J 195/00* (2013.01); *C10C 3/00* (2013.01); *C08L 91/06* (2013.01)

(58) Field of Classification Search
USPC .......... 404/82; 208/23; 106/273.1, 276–280; 524/59, 62–71
See application file for complete search history.

(56) References Cited

U.S. PATENT DOCUMENTS

| | | | |
|---|---|---|---|
| 1,758,913 A | * | 5/1930 | Sadtler .................... C08L 95/00 404/81 |
| 2,229,872 A | | 1/1941 | Pullar |
| 2,646,361 A | | 7/1953 | Rostler |
| 2,706,688 A | | 4/1955 | Sommer et al. |
| 2,851,824 A | | 9/1958 | Campbell |
| 2,927,402 A | | 3/1960 | Goren et al. |
| 3,110,604 A | | 11/1963 | MConnaughay |
| 3,152,101 A | | 12/1964 | Rostler |
| 3,297,617 A | | 1/1967 | Regenstein, Jr. et al. |

(Continued)

FOREIGN PATENT DOCUMENTS

| | | |
|---|---|---|
| CA | 1152795 | 8/1983 |
| WO | 2007061947 A2 | 5/2007 |
| WO | 2016087498 A1 | 6/2016 |

OTHER PUBLICATIONS

Paramount Petroleum. AR-8000 Asphalt Cement Product Specifications. Feb. 1, 2003. http://www.ppcla.com/documents/AR800013407.pdf.*

(Continued)

*Primary Examiner* — Matthew D Troutman
(74) *Attorney, Agent, or Firm* — Butler Snow LLP

(57) ABSTRACT

A method of applying building a pavement structure using a polymer modified hot-applied tack coat is disclosed. This polymer modified tack coat is non-adhesive at ambient temperatures, and, thus, also non tracking. The tack is applied while hot, but cools quickly. The subsequent application of hot mix asphalt results in a superior bond between the asphalt layer and the tack layer. It is particularly well suited to bonded friction course applications since it removes the necessity of specialized spray paving machinery and allows the use of conventional asphalt distributors and pavers.

11 Claims, 1 Drawing Sheet

(56) References Cited

U.S. PATENT DOCUMENTS

| | | | |
|---|---|---|---|
| 3,316,203 A * | 4/1967 | Dereich | E01C 7/30 |
| | | | 260/998.19 |
| 3,336,146 A | 8/1967 | Henschel | |
| 3,404,108 A | 10/1968 | Regenstein, Jr. et al. | |
| 3,432,321 A | 3/1969 | Rostler | |
| 3,703,393 A | 11/1972 | Koons | |
| 3,891,585 A | 6/1975 | McDonald | |
| 4,068,023 A * | 1/1978 | Nielsen et al. | 427/138 |
| 4,069,182 A * | 1/1978 | McDonald | C08L 95/00 |
| | | | 404/72 |
| 4,094,696 A | 6/1978 | Burris | |
| 4,151,025 A * | 4/1979 | Jacobs | 156/71 |
| 4,198,177 A * | 4/1980 | Ray et al. | 404/75 |
| 4,236,951 A | 12/1980 | Krchma et al. | |
| 4,242,246 A * | 12/1980 | Maldonado et al. | 524/71 |
| 4,405,375 A | 9/1983 | Gibson et al. | |
| 4,437,896 A | 3/1984 | Partanen | |
| 4,485,201 A * | 11/1984 | Davis | C08L 95/00 |
| | | | 428/63 |
| 4,561,905 A | 12/1985 | Kittle | |
| 4,571,116 A | 2/1986 | Patil et al. | |
| 4,762,565 A * | 8/1988 | Graf | 106/277 |
| 4,835,199 A | 5/1989 | Futamura et al. | |
| 4,836,857 A * | 6/1989 | Hopkins | 106/284.4 |
| 4,878,950 A | 11/1989 | Halasz et al. | |
| 5,047,457 A | 9/1991 | Higgins | |
| 5,069,578 A * | 12/1991 | Bense et al. | 404/75 |
| 5,246,986 A | 9/1993 | Pierre et al. | |
| 5,296,264 A | 3/1994 | Blacklidge et al. | |
| 5,455,291 A * | 10/1995 | Bruns | C08L 95/00 |
| | | | 524/66 |
| 5,503,871 A | 4/1996 | Blacklidge et al. | |
| 5,683,497 A | 11/1997 | Suchanec | |
| 5,713,996 A | 2/1998 | Morris et al. | |
| 5,735,634 A * | 4/1998 | Ulrich et al. | 404/102 |
| 5,769,567 A * | 6/1998 | Durand et al. | 404/75 |
| 5,772,749 A * | 6/1998 | Schilling | C08G 73/028 |
| | | | 106/277 |
| 6,033,147 A | 3/2000 | Richter | |
| 6,113,659 A | 9/2000 | Logaraj et al. | |
| 6,158,920 A | 12/2000 | Malot | |
| 6,194,472 B1 | 2/2001 | Logaraj et al. | |
| 6,362,257 B1 | 3/2002 | Chehovits et al. | |
| 6,444,258 B1 * | 9/2002 | Terry | 427/138 |
| 6,706,787 B1 * | 3/2004 | Burris | C08L 95/005 |
| | | | 524/59 |
| 6,786,961 B2 | 9/2004 | Honma et al. | |
| 6,988,849 B1 * | 1/2006 | Zimmerman | 404/95 |
| 7,074,846 B2 * | 7/2006 | Sylvester | C08L 95/00 |
| | | | 524/68 |
| 7,207,744 B2 * | 4/2007 | Jones et al. | 404/75 |
| 7,357,594 B2 * | 4/2008 | Takamura | 404/75 |
| 7,503,724 B2 * | 3/2009 | Blacklidge | 404/82 |
| 7,595,356 B2 * | 9/2009 | Lommerts | C08L 95/00 |
| | | | 524/228 |
| 7,811,373 B2 * | 10/2010 | Partanen | C08L 95/00 |
| | | | 106/284 |
| 7,918,624 B2 * | 4/2011 | Blacklidge | 404/75 |
| 8,061,931 B2 * | 11/2011 | Musil | 404/111 |
| 8,067,487 B2 * | 11/2011 | Thayer et al. | 524/2 |
| 8,608,845 B2 * | 12/2013 | Naidoo et al. | 106/273.1 |
| 8,764,340 B2 | 7/2014 | Campbell | |
| 2004/0120765 A1 * | 6/2004 | Jones et al. | 404/35 |
| 2004/0204939 A1 | 10/2004 | Liu et al. | |
| 2006/0223916 A1 * | 10/2006 | Stuart, Jr. | C08L 95/00 |
| | | | 524/59 |
| 2007/0141241 A1 * | 6/2007 | Blacklidge | 427/138 |
| 2007/0199476 A1 * | 8/2007 | Bobee | C08L 95/00 |
| | | | 106/275 |
| 2007/0282039 A1 * | 12/2007 | Smith | C08L 95/00 |
| | | | 524/59 |
| 2008/0188594 A1 * | 8/2008 | Takamura | 524/60 |
| 2008/0210126 A1 * | 9/2008 | Apeagyei et al. | 106/273.1 |
| 2008/0287570 A1 * | 11/2008 | Thayer et al. | 524/5 |
| 2009/0004387 A1 * | 1/2009 | Trumbore | C08L 95/00 |
| | | | 427/289 |
| 2009/0097917 A1 * | 4/2009 | Newton et al. | 404/70 |
| 2009/0105376 A1 * | 4/2009 | Korenstra et al. | 524/68 |
| 2009/0169901 A1 * | 7/2009 | Blacklidge | 428/454 |
| 2009/0182074 A1 * | 7/2009 | Scholten | 524/68 |
| 2009/0257824 A1 * | 10/2009 | Musil | 404/79 |
| 2009/0269134 A1 * | 10/2009 | Wingo et al. | 404/17 |
| 2010/0168274 A1 * | 7/2010 | Coe | 523/204 |
| 2017/0073531 A1 | 3/2017 | Zhou et al. | |

OTHER PUBLICATIONS

ICG Industrial de Mexico, Aqueous SBS Technical Bulletin BICOX ICG15253.

Texas Department of Transportation Technical Advisory, Guidance on Minimum Roadway Placement Temperatures (Mar. 14, 2006), available at http://ftp.dot.state.tx.us/pub/txdot-info/cmd/tech/ta_pavement_placement.pdf.

ASTM International, Standard for Selection and Use of Emulsified Asphalts D3628-08 (2008).

Ted Strong, Richmond paving away for bike races in September (Richmond Times-Dispatch Jun. 16, 2015).

Pavement Design Guide manual, Jan. 1, 2011 (TxDOT online manuals) Chapter 6, available at http://onlinemanuals.txdot.gov/txdotmanuals/pdm/pdm.pdf.

National Asphalt Pavement Assoc., Best Practices for Emulsion Tack Coats (Oct. 2013).

NCHRP, Report 712—Optimization of Tack Coat for HMA Placement.

Kimberly Kurtis, "Asphalt and Asphalt Concrete," Comparison of Grading Schemes (Georgia Institute of Technology 2004).

Paramount Petroleum, "AR-4000 Product Specifications" (Feb. 1, 2003).

ASTM International, ASTM D3381-12, "Standard Specification for Viscosity-Graded Asphalt Cement for Use in Pavement Construction," (ASTM Int'l, West Conshohocken, Penn. Dec. 2012).

Tom Kuennen, "Bonded for Life," (Equipment World's Better Roads Jul. 21, 2016), available at http://www.equipmentworld.com/how-the-bond-coat-makes-for-long-lasting-roads-and-how-new-materials-are-making-it-more-effective/.

Brittany Blacklidge, YouTube Video, "Rolling in UltraFuse 20 seconds after application," available at https://www.youtube.com/watch?v=qnAFzanIYZo.

Blacklidge Emulsions, Inc., YouTube Video, "UltraFuse," available at https://www.youtube.com/watch?v=r_YwrdbG2N0.

Brittany Blacklidge and Blacklidge Emulsions, Inc., Screen Shots of videos "Rolling in UltraFuse 20 seconds after application," and "UltraFuse".

Pavement Interactive, "Emulsified Asphalt," (Aug. 15, 2007), available at http://www.pavementinteractive.org/article/emulsified-asphalt/.

Flexible Pavements of Ohio, "Technical Bulletin: Proper Tack Coat Application," (Dublin, OH Sep. 19, 2012).

ASTM International, ASTM D946-15, "Standard Specification for Penetration-Graded Asphalt Binder for Use in Pavement Construction," (ASTM Int'l, West Conshohocken, Penn. Jan. 2016).

Asphalt Institute, Florida, Mar. 29, 2017, Section 916-3.1.

Asphalt Applications, Solving Problems in Meeting Specifications Technical Information.

Special Notes/Special Provisions Kentucky Department of Transportation Jun. 15, 2018; https://transportation.ky.gov/Construction/Pages/Special-Notes-Special-Provisions.aspx.

Gayle King et al., Spray Applied Emulsion Preventive Maintenance Treatments: FHWA Research Study; 1st Sprayed Sealing Conference, Adelaide Australia 2008.

Material Safety Data Sheet INDULIN(R) W-5, Colas Solutions, Inc. Jul. 20, 2012.

Texas Department of Transportation, 2003, Development of an Objective Field Test to Determine Tack Coat Adequacy.

Virginia Center for Transportation Innovation & Research, Trackless Tack Coat Materials: A Laboratory Evaluation for Performance Acceptance, Final Report VCTIR 12-R14.

Repsol; https://www.repsol.com/.

(56) References Cited

OTHER PUBLICATIONS

British Standard BS 3690-1: 1989; Bitumens for building and civil engineering, Apr. 25, 2002.
British Standard BS EN 12591:2009 Bitumen and bituminous binders-Specifications for paving grade bitumens, BSI 2011.
TRB Webinar: Asphalt Emulsions: Chemistry, Manufacturing, and Applications Power Point (Transportation Research Board of the National Academies).
Spray Applied Polymer Surface Seals.
King, G. et al., Modified Asphalt Emulsions: Compositions, Uses and Specifications for Surface treatments, Technical Report Dec. 2011.
King, G. et al., SHRP test evaluation of High Float and Polymer Modified Bitumen emulsion residues, Jan. 1993.
Boone, Tammy; HPS Story, WOSS-Western Oil Spreading Services, Inc.; California Asphalt Magazine 2007.
Ryan, Jim; Multipurpose Premium HPS (No Track Tack) Polymerized Tack Coat, Trackless Interlayer, Fabric Tacking Material, Crack/Seal Filler.
Etnyre, Black-Topper SHOOTER Series Asphalt Distributor Updates and Service Manual, M-132-04R1.
Asphalt Institute, Mississippi, Mar. 29, 2017, Section 702-Bituminous Material.
Asphalt Emulsion, Asphalt Institute, A Basic Asphalt Emulsion Manual, Series No. 19, Third Edition.
A Novel Generation of Tack Coat Emulsions to Avoid Adhesion to Tyres, 4-F-086.
Part 1, Standard Specifications for the Construction of Roads and Bridges on Federal Highway Project, FP-96 1996.
Part 2, Standard Specifications for the Construction of Roads and Bridges on Federal Highway Project, FP-96 1996.
Part 3, Standard Specifications for the Construction of Roads and Bridges on Federal Highway Project, FP-96 1996.
Part 4, Standard Specifications for the Construction of Roads and Bridges on Federal Highway Project, FP-96 1996.
Website: BidNet—http://www.bidnet.com/closed-government-contracts/50-lg—asphalt—hpe-trackless-tack-ntqs-1hh?itemld=353532772.
Does Your Asphalt Overlay Look Like This? WOSS Western Oil Spreading Services Incorporated; By: Tammy Boone; California Asphalt Magazine, 2007 Quality Issue.
Multipurpose Premium HPS (No Track Tack) Polymerized Tack Coat, Trackless Interlayer, Fabric tacking Material, Crack Seal/Filler; written by: Jim Ryan, Paramount Petroleum.
Materials from EXXON Corporation Specialty Products, Process for Oils for the Rubber Industry, (1989), dated Sep. 4, 1991, regarding Flexon Product Specifications, pp. 1-15.
Shellflex Oils, Technical Bulletin Shell Oil Company SOC: 506-89. (mo. & yr. unavailable).
Chemical Abstract #64742-04-07, 2 pages.
Brochure from: Dust Allayers, Inc., 2720 Park Avenue East, Mansfield, Ohio 44902 (mo. & yr. unavailable).
Paint—Coatings Dictionary, Definitions Committee of the Federation of Societies for Coatings Technology, (1978), pp. 38, 39, 59, 64, 163, 202, 354, 416, 441, 476, 551, 552, 574, 600 and 601 (mo unavailable).
Standard Specifications for Transportation Materials and Methods of Sampling and Testing, American Association of State Highway and Transporation Officials (AASHTO) (1990) pp. vii-xiii, 5, 71-74, 125-1126, 145-146, 421, 456-457, 478 and 807-808 (mo unavailable).
Standard Specifications for Road and Bridge Construction, Department of Transporation-Florida (1986), pp. 223-235 and 626-635 (mo unavailable).
Standard Specifications for Road and Bridge Construction, Department of Transporation-Illinois (1988), pp. iii-vi, 172-187; 190-196 and 682-697 (mo unavailable).
Standard Specifications for Road and Bridge Construction, Department of Highways—Kentucky (1988), pp. v-viii, 179, 182-183, 185, 189-190, 240-250 and 651-658 (mo unavailable).
Standard Specifications for Road and Bridge Construction, Department of Transporation and Development-Louisiana (1982), pp. iii-v, 161-165 and 474-484 (mo unavailable).
Standard Specifications for Road and Bridge Construction, State Highway Commission-Mississippi (1990), pp. i-xi, 101-1-101-13; 405-5-405-8 and 702-1-702-7 (mo unavailable).
Standard Specifications for Road and Bridge Construction, Department of Transporation-Oklahoma (1988), pp. i-ix, 3-11, 134-141, 145-153, 157-163 and 394-405 (mo unavailable).
Standard Specifications for Road and Bridge Construction, State Highway Department-South Carolina (1986), pp. i-xxi, 135, 140, 146-147, 150-151, 156-167, 200-217-221 and 238-247 (mo unavailable).
A Basic Asphalt Emulsion Manual, Series No. 19, Third Edition, 1998, Asphalt Emulsion Manufacturers' Association.
Bardesi, O.E., and D.A. Paez "A Novel Generation of Tack Coat Emulsions to Avoid Adhesion to Tyres" Paper 4F-086, Proc., 3rd World Congress on Emulsions, Lyon, France, 2002.
Pfeiffer & Van Doormaal, "The Rheological Properties of Asphaltic Bitumens," J. Inst. Pet, vol. 22, pp. 414-440, 1936.
A History of Plants, Equipment, and Methods in Bituminous Paving, AAPT 50th Anniversary Historical Review, 1974, pp. 159-296 ("AAPT Review").
The Asphalt Handbook, Asphalt Institute publication MS-4, 1989.
Miro Recasens, R.A. Martinez, and F. Perez Jimenez. "Assessing heat-adhesive emulsions for tack coats." Proceedings of the Institution of Civil Engineers. Transport. vol. 158. No. 1. Institution of Civil Engineers, 2005.
Duenas, Antonio Paez, and Rodrigo Miro Recasens. Isiones de adherencia resistentes al trafico de obra. Carreteras: Revista tecnica de la Asociacion Espanola de la Carretera 128 (2003): 27-36.
Potti, J.J., Jose Luis Pena and F. Guzman. "Emulsiones termoadherentes para riegos de adherencia." Carreteras: Revista tecnica de la Asociacion Espanola de la Carretera 128 (2003): 17-26.
Corte, Jean-Francois. "Development and uses of hard-grade asphalt and of high-modulus asphalt mixes in France." Transportation Research Circular 503 (2001); 12-31.
Shell Bitumen. The Shell Bitumen Handbook. Telford, 2003 ("Shell Bitumen Handbook").
A Basic Asphalt Emulsion Manual, Manual Series No. 19, Third Edition (BAEM).
US DOT Specification FP96-2001.
Gordillo, "Comparison of Different Test Methods for the Obtention and Characterization of Residual Binders of Pure and Modified Bitumen Emulsions", Second World Congress on Emulsion, Sep. 23-26, 1997.
James, A. et al. "Emulsification of High Softening Point Materials," 3rd World Congress on Emulsion, Lyon, France 24-247 Sep. 2002.
ASTM D5-Penetration of Bituminous Materials.
ASTM D36-1995 Softening Point of Bitumen.
ASTM D6997-Distillation of Emulsified Asphalt.
ASTM D6934-Residue by Evaporation of Emulsified Asphalt.
PAIKY Plantmix Asphalt Industry of Kentucky Jan. 2017 Newsletter and Trackless Tack Price Adjustment Schedule.
Redicote E-9 Asphalt Application Technical Information.
Lysenko, Fundamental Bitumen Emulsion Particle Properties and Storage Stability, Pioneer Road Services Pty Ltd.
CTAA 2013-07 Measuring Surface Tackiness of Modified Asphalt Binders and Emulsion Residues using a Dynamic Shear Rheometer.
Akzo Nobel Asphalt Application, Akzo Nobel Surface Chemistry, 2015.
Boussad, Nadjib et al., Emulsifier Content in Water Phase and Particle Size Distrbution: Two Key-parameters for the Management of Bituminous Emulsion Performance, Eurasphalt & Eurobitume Congress 1996.
Giorgi, Claude et al., Design of a "Clean" Bitumen Modified emulsion that Keeps Long Storage Time Properties, file://D:html\abstract\theme04\4f-123.htm.
Emulsamine Arkema L60, CECA Arkema Group, France.
AkzoNobel Surface Chemistry, The Paving Manual, Asphalt Applications Product and Application Data, Americas Nov. 2009.
Redicote 4442 Asphalt Applications Technical Information.

(56) References Cited

OTHER PUBLICATIONS

AkzoNobel Technical Service Report No. 0408, May 16, 2000, Emulsification of hard asphalt: Canada.
Environmental Protection Agency Jun. 1997, Polymer Exemption Guidance Manual.
Standard Specifications for Road and Bridges, Department of Transporation and Development-Louisiana 2000 Edition.
Asphalt Institute, Louisiana Mar. 29, 2017 re: Section 1002-Asphalt materials.
Asphalt Institute, Georgia Mar. 29, 2017 re: Section 822 Emulsified-Asphalt.
Asphalt Institute, California Jan. 23, 2017 re: Section 94-Asphaltic Emulsions.

\* cited by examiner

HOT APPLIED TACK COAT

CROSS-REFERENCE TO RELATED APPLICATIONS

This application claims the benefit of U.S. Provisional Application Ser. No. 61/307,749 which was filed on Feb. 24, 2010.

FIELD OF THE INVENTION

The present invention is generally directed toward a non-tracking, hot applied tack coat for bonding two layers of hot mix asphalt together and its methods of application.

BACKGROUND OF THE INVENTION

Thin Mix HMA, Bonded Friction Course, and Open Graded Friction Courses (OGFC) (also known as Porous friction Courses, Gap Graded Asphalts, or Stone Matrix Asphalts) have grown in popularity in recent years due to their important advantages over the roadways paved with dense graded hot mix asphalt (HMA) and over concrete pavements. These advantages include a reduced risk of hydroplaning, improved drainage, improved visibility, coarse surface for improved friction values, and reduced noise. However, the disadvantages of OGFC have been well documented and include reduced durability, debonding of the OGFC layer, and stripping in the OGFC and underlying areas.

The durability issues have been largely addressed by the use of a Bonded Friction Course (BFC) system that employs the use of improved polymerized tack coat materials and processes. One such Bonded Friction Course system, known as the NOVACHIP process and described in U.S. Pat. No. 5,069,578, uses a specialized "Spray Paver" machine to apply a thick layer of polymer modified tack coat immediately before a thin gap-graded HMA layer is applied. This polymer modified tack coat wicks into the new gap graded mix by displacement and water vaporization. The tack coat provides a degree of adhesion or bonding between the layers and also acts to reduce slippage and sliding of the layers relative to other layers in the pavement structure during use or due to wear and weathering of the pavement structure. The thick application of the tack coat further seals minor cracks in the existing surface layer and forms a strong bond between the new HMA layer and the existing pavement.

However, the NOVACHIP bonded friction course system can be prohibitively expensive due to the requirement that the specialized "Spray Paver" machine be used. Currently, each spray paver machine costs almost $500,000.00, and many contractors and state agencies cannot justify the expense. However, without the use of the NOVACHIP Spray Paver, the thick layer of emulsified polymer modified tack coat used in a bonded friction course system would be very difficult to work with. The thick layer of emulsion tack coat would have a very slow cure rate, resulting in unacceptable delays and also tracking of the tack coat layer. Tracking occurs when the tack or bonding coat is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended volume from the area awaiting a new pavement layer.

Insufficient adhesion between a new layer of pavement and an existing base course, a previously laid pavement layer, or a prepared pavement surface can cause pavement separation and cracking during construction of the structure, as well as subsequent failures and premature deterioration of the pavement structure and/or surface. Such conditions often require costly repairs, can cause damage to vehicles traveling on the surface and may cause dangerous traffic conditions threatening damage to property and injury to vehicles and passengers.

SUMMARY OF THE INVENTION

We disclose a new system for creating a bonded friction course pavement structure that does not require the use of specialized machinery for its application. The system employs conventional asphalt distributors to place a hot-applied, polymer modified tack coat having the properties after cooling of being non-adhesive at ambient temperatures. The polymer modified tack coat layer is applied while hot, at temperatures greater than 212° F. in a liquid form, and may be allowed to cool to ambient temperatures. At ambient temperatures, the polymer modified tack coat is non-tracking and non-adhesive. However, when it comes into contact with a new hot mix asphalt layer, the polymer modified tack coat becomes adhesive, again. The resulting pavement structure made through use of the claimed methods has improved strength compared to other known paving systems.

BRIEF DESCRIPTION OF THE DRAWINGS

Further advantages of the invention will become apparent by reference to the detailed description of preferred embodiments when considered in conjunction with the drawings.

DETAILED DESCRIPTION

Figure 1:
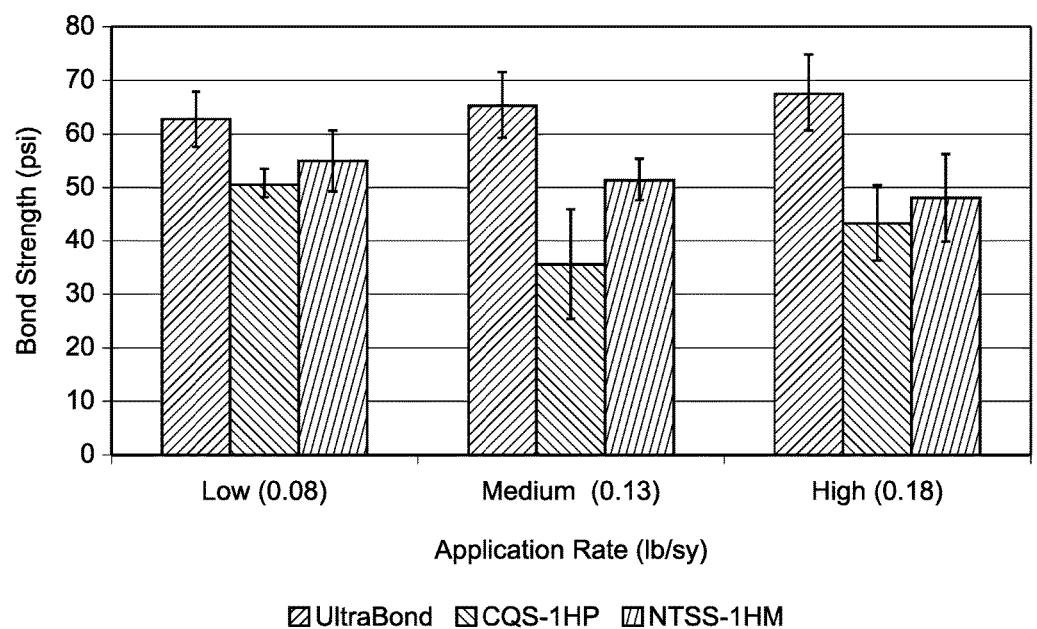
FIG. 1 is a graph comparing the interface strengths of different tack materials.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

By using a non-tracking, polymer modified tack coat that is non-adhesive at ambient temperatures, a specialized "Spray Paver," such as that used in the NOVACHIP bonded friction course system, is no longer required. Instead, conventional distributors and paving equipment can be used. The hot-applied polymer modified tack coat is heated until it is liquid and sprayable and, then, sprayed on the pavement to create the thick layer. Typically this tack coat is applied at the rate of 0.04 to 0.8 gals/yd$^2$ for a conventional HMA overlay, or 0.09 to 0.18 gals/yd$^2$ for a Bonded Friction Course. Once applied, the layer of tack coat cures hard to the touch in seconds to form a non-tracking surface. Cracks that may exist in existing pavement are filled by this thick layer, thus sealing the surface. A hot-mix asphalt layer can, then, be placed over the tack coat layer almost instantly after the tack coat layer has cooled.

As the tack coat cools, it becomes non-adhesive, and, therefore, non-tracking. Vehicles can drive over this layer without fear of the tack coat sticking to the tires of the vehicles. When the hot-mix asphalt layer is applied on top of the tack coat, the heat of the HMA layer causes the tack coat to liquefy, and this liquefied polymer modified membrane is wicked into the HMA layer by displacement. At the higher temperatures of the hot mix layer, the tack coat is extremely adhesive, allowing it to form a strong structural bond with the OGFC or other hot mix asphalt layer. As the polymer modified tack coat cools, the bond with the hot mix asphalt layer becomes stronger. However, the polymer modified tack coat retains its flexibility.

It should be appreciated that this polymer modified trackless tack coat is particularly useful in Open Graded Friction Course, Bonded Friction Course, and thin overlay mixes where the material was previously applied with specialized distributors, such as "Spray Pavers." However, using the claimed method only a conventional distributor and paver are required. As a result, the methods disclosed are available to all contractors and government agencies that do not want to purchase a proprietary or specialized machine.

The disclosed method may use any tack coat formulation that has the desired properties of being adhesive only at higher temperatures, but not at ambient temperatures. The tack coat can be made by blending a low pen asphalt and/or with a polymer. Harder asphalts with low pen values have higher softening points. By reducing the amount of hard pen asphalt in an asphalt composition, and increasing the amount of other ingredients such as polymers, an asphalt composition can be made that has a softening point that is lower than the temperature of hot mix asphalt, but high enough that it is not adhesive when it cools to ambient temperatures. In one embodiment, the non-tracking polymer modified tack coat can be made by producing an asphalt cement having a penetration of 0 to 50 dmm and combining its polymers and additives to achieve a softening point of 135° C. or higher.

The polymers and additives in the tack coat add strength and flexibility to the tack coat. The polymers and additives are added at various concentrations to an asphalt cement in order to achieve the desired physical properties of the trackless tack. The polymers that can be used in modifying the tack coat include, but are not limited to, SBS, SB, SEBS, XSB, EVA, polypropylene, acrylic polymers, Ground Tire Rubber, natural and synthetic waxes, Gilsonite, Trinidad Lake Asphalt, plastomers, elastomers, hardeners and softeners, or any combination, including oxidizing, thereof known in the art that allows the tack coat to achieve the properties of being non-adhesive at ambient temperatures. For the purposes of this application, ambient temperature is any temperature that is typically used in paving applications. Currently, paving is typically only performed at temperatures greater than 40° F.

EXAMPLES

The following standard procedures of the American Association of State Highway and Transportation Officials (AASHTO) were used in preparing and testing the pavement compositions. Softening Point (using Ring and Ball Apparatus) was tested as per AASHTO T53. Penetration was tested as per AASHTO T49. Rotational Viscosity was determined as per AASHTO T316. Rheological properties were tested using a Dynamic Shear Rheometer pursuant to AASHTO T315 or PAV(Pressure Aging Vessel) DSR as per AASHTO T315. Flexural Creep Stiffness was tested using Bending Beam Rheometer as per AASHTO T313. Separation of Polymer from Polymer Modified Asphalt was tested as per AASHTO T53 and ASTM D7173.

In one embodiment, the polymer modified trackless tack has the following properties:

TABLE 1

PHYSICAL PROPERTIES

| PARAMETER | TEST METHOD | MIN | MAX |
| --- | --- | --- | --- |
| Rotational Viscosity @ 135° C., Cp | AASHTO T316 | — | 3000 |
| Penetration @ 25° C. | ASTM D5 | — | 50 |
| Softening Point (° C.) | ASTM D36 | 70 | — |
| Original DSR @ 82° C. (G*/SIN δ, 10 rad/sec) | AASHTO T315 | 1.0 | — |

In another embodiment, the polymer modified trackless tack is produced by creating a blend consisting of Marathon Hard Pen asphalt with 47% asphalt concentrate of SBS using paddles agitation at 350° F. and 0.5% anti-strip agent, such as Adhere LOF 65-00. The resulting polymer modified tack coat had the following properties:

| PARAMETER | TEST METHOD | Result |
| --- | --- | --- |
| Penetration @ 25° C. | ASTM D5 | 18 dmm |
| Softening Point (° F.) | ASTM D36 | 149° F. |

The softening point is well above ambient temperatures for pavement applications, and, therefore, the resultant polymer modified tack is non-adhesive at ambient temperatures. The tack may then be heated to above 212° F. and applied to a substrate pavement layer, such as a pre-existing pavement at the conventional spray rate of 0.04 to 0.08 gals/yd2 for a conventional HMA overlay, or 0.09 to 0.18 gals/yd2 for a Bonded Friction Course. The hot tack coat will bond with the substrate layer and cool to a hard surface that is non-adhesive. A hot mix asphalt layer is then applied to the pavement layer. The heat from the hot mix asphalt is significantly higher than the softening point of the tack coat, causing it to liquefy and be wicked into the hot mix asphalt where it can form a strong bond as the asphalt cools below the softening point of the tack.

Tests show that the use of the disclosed polymer modified hot tack results in a significantly increased interfacial bond strength between the pavement layers, compared to regular tack methods and materials. As previously discussed, separation of layers will cause premature failure of the roadway, possibly resulting in damage to vehicles or even death. In one test by the National Center for Asphalt Technology, nine slabs consisting of two inches of 12.5 mm open-graded friction course overlaid on two inches of 12.5 mm dense-graded asphalt were prepared and tested. The three tacks tested included the hot applied polymer modified tack as disclosed herein (also referred to as Ultrabond at the time of testing); CQS-1HP, a generic form of NOVABOND tack used by the Alabama Department of Transportation; and NTSS-1HM, a trackless tack made by Blacklidge Emulsions, Inc. (Gulfport, Miss.) which is also the subject of U.S. Pat. No. 7,503,724. Six 6-inch specimens were cored from each slab. Two specimens from each slab were cut in half to evaluate the extent of tack coat migration into the OGFC layer. The remaining four specimens were evaluated for bond strength.

TABLE 3

Testing specifications:

| Tack | Spray Application Rate (gal/yd²) | Residual Application Rate (gal/yd²) | Number of Slabs Prepared | Number of Cores | Cores for Migration Investigation | Cores for Bond Strength Testing |
|---|---|---|---|---|---|---|
| Hot Applied Polymer Modified Tack | 0.080 | 0.080 | 1 | 6 | 2 | 4 |
| Hot Applied Polymer Modified Tack | 0.130 | 0.130 | 1 | 6 | 2 | 4 |
| Hot Applied Polymer Modified Tack | 0.180 | 0.180 | 1 | 6 | 2 | 4 |
| CQS-1HP | 0.130 | 0.080 | 1 | 6 | 2 | 4 |
| CQS-1HP | 0.215 | 0.130 | 1 | 6 | 2 | 4 |
| CQS-1HP | 0.300 | 0.180 | 1 | 6 | 2 | 4 |
| NTSS-1HM | 0.160 | 0.080 | 1 | 6 | 2 | 4 |
| NTSS-1HM | 0.260 | 0.130 | 1 | 6 | 2 | 4 |
| NTSS-1HM | 0.360 | 0.180 | 1 | 6 | 2 | 4 |
| Total | | | 9 | 54 | 18 | 36 |

Test specimens were conditioned in an environmental chamber at 77° F. (25° C.) for a minimum of two hours prior to testing. The specimens were, then, loaded into a bond strength device, with the marked layer interface centered between the edge of the shearing block and the edge of the reaction head. Only the shearing block was allowed to move, and the reaction block was stationary. The specimen and the bond strength device were placed in the Geotest S5840 test apparatus with the loading head on top of the bonded interface. The loading apparatus applied a vertical shear load in a controlled displacement mode (0.1 inches/minute) to determine the maximum shear load and maximum displacement of the interface. For each test specimen, the interface bond strength was calculated by dividing the maximum shear load by the cross-sectional area of the specimen.

FIG. 1 compares the average interfacial bond strengths of the three tack coat materials at three application rates. It should be appreciated that interfacial bond of the presently disclosed tack coat was significantly higher than either of the two prior art tacks. Furthermore, the cores in which the CQS-1HP and NTSS-1HM tack coat materials were used broke cleanly at the interface, indicating that it was the weakest junction between the pavement layers. However, in the cores in which the presently disclosed hot-applied tack material was used, they sheared through the OGFC layer instead of the interface, presumably due to the interface shear strength exceeding the shear strength of the OGFC mix.

The interfacial strength that results from using the disclosed invention is impressive. It suggests, as it indicates, that a road made according to the methods herein would result in a lower chance of failure. Not only will this increase the life of the paved surface, but it could result in decreased damage to vehicles or their passengers due to OGFC that separates from the substrate layers. Therefore, not only does the invention provide significant benefit due to its non-tracking properties at ambient temperatures and the removal of the need for specialized paving machinery, it also creates stronger and safer pavement structures.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Accordingly, the scope of the invention should be limited only by the attached claims. Whenever a range is disclosed, all subranges and individual values are intended to be encompassed. This invention is not to be limited by the embodiments disclosed, including any shown in the drawings or exemplified in the specification, which are given by way of example and not of limitation.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

The invention claimed is:

1. A method for bonding a layer of asphalt pavement material to a substrate pavement layer comprising:

(a) heating a non-aqueous tack coat to over 212° F. until it is liquid, said non-aqueous tack coat comprising a low pen petroleum based asphalt ingredient, said low pen petroleum based asphalt ingredient has an original pen value of less than about 40 dmm at 25° C. and a softening point greater than about 140° F., which is sprayable and adhesive when heated to temperatures exceeding 212° F.;

(b) applying said non-aqueous tack coat to the substrate pavement layer, said non-aqueous tack coat being non-adhesive at ambient temperatures, wherein an original sample of said non-aqueous tack coat has a pen value less than 30 dmm at 25° C.; and (c) applying a layer of heated asphalt pavement material on top of said non-aqueous tack coat.

2. The method of claim 1 wherein said heated asphalt pavement material is hotter than the softening point temperature of said non-aqueous tack coat.

3. The method of claim 1 wherein an original sample of said non-aqueous tack coat has a pen value of 18 dmm or less at 25° C.

4. The method of claim 1 wherein said non-aqueous tack coat has been modified by the addition of at least one additive ingredient selected from the list consisting of SBS, SB, SEBS, XSB, EVA, polyolefins, acrylic polymers, Ground Tire Rubber, natural and synthetic waxes, Gilsonite, Trinidad Lake Asphalt, plastomers, elastomers, hardeners, softeners, and any combination thereof, including oxidizing.

5. A method of constructing a multiple layer pavement structure comprising:

a. applying a non-aqueous tack coat layer to a substrate pavement layer, said non-aqueous tack coat layer being non-adhesive at ambient temperatures and adhesive when heated to temperatures exceeding 212° F., wherein an original sample of said non-aqueous tack coat layer has a pen value less than 30 dmm at 25° C., wherein said non-aqueous tack coat layer is comprised of a mixture of a low pen petroleum based asphalt ingredient and at least one additive ingredient, said low pen petroleum based asphalt ingredient has an original pen value of less than about 40 dmm at 25° C. and a softening point greater than about 140° F.;

b. allowing said non-aqueous tack coat layer to cool; and c. applying an asphalt layer on top of said non-aqueous tack coat layer, said asphalt layer heated to a temperature sufficient to increase the adhesive properties of said non-aqueous tack coat layer.

6. The method of claim 5 wherein said pavement structure is a bonded friction course.

7. The method of claim 6 wherein said non-aqueous tack coat layer further comprises an anti-stripping agent.

8. A method for bonding a layer of asphalt pavement material to a substrate pavement layer comprising:

(a) heating a non-aqueous tack coat to over 212° F. until it is liquid, said non-aqueous tack coat comprising a low pen petroleum based asphalt ingredient and said low pen petroleum based asphalt ingredient has an original pen value of less than about 40 dmm at 25° C. and a softening point greater than about 140° F., which is sprayable and adhesive when heated to temperatures exceeding 212° F.;

(b) applying said non-aqueous tack coat to the substrate pavement layer, said non-aqueous tack coat being non-adhesive at temperatures below said non-aqueous tack coat's softening point, and wherein an original sample of said non-aqueous tack coat has a pen value less than 30 dmm at 25° C.; and (c) applying a layer of asphalt pavement material on top of said non-aqueous tack coat.

9. The method of claim 8 wherein said asphalt pavement material is hotter than said non-aqueous tack coat's softening point.

10. The method of claim 8 wherein an original sample of said non-aqueous tack coat has a pen value of 18 dmm or less at 25° C.

11. The method of claim 8 wherein said non-aqueous tack coat has been modified by the addition of at least one additive ingredient selected from the list consisting of SBS, SB, SEBS, XSB, EVA, polyolefins, acrylic polymers, Ground Tire Rubber, natural and synthetic waxes, Gilsonite, Trinidad Lake Asphalt, plastomers, elastomers, hardeners, softeners, and any combination thereof, including oxidizing.

\* \* \* \* \*